(12) United States Patent
Fricke

(10) Patent No.: US 11,137,317 B2
(45) Date of Patent: Oct. 5, 2021

(54) OTDR USING AN ELECTRO-ABSORPTION MODULATOR FOR BOTH PULSE FORMING AND PULSE DETECTION

(71) Applicant: Xieon Networks S.à.r.l., Senningerberg (LU)

(72) Inventor: Andreas Fricke, Munich (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 15/728,974

(22) Filed: Oct. 10, 2017

(65) Prior Publication Data
US 2018/0113050 A1    Apr. 26, 2018

(30) Foreign Application Priority Data

Oct. 20, 2016  (EP) ..................... 16194825

(51) Int. Cl.
*G01M 11/00*    (2006.01)
(52) U.S. Cl.
CPC ............................ *G01M 11/3145* (2013.01)
(58) Field of Classification Search
CPC ................................................ G01M 11/3145
USPC ....................................................... 356/73.1
See application file for complete search history.

(56) References Cited

U.S. PATENT DOCUMENTS

| | | | | | |
|---|---|---|---|---|---|
| 4,997,245 | A | * | 3/1991 | DuPuy | .................. G02F 1/3132 385/16 |
| 5,566,263 | A | * | 10/1996 | Smith | .................. G02F 1/0123 250/227.11 |
| 5,764,822 | A | * | 6/1998 | Madabhushi | .................. G02F 1/2255 385/131 |
| 6,122,044 | A | * | 9/2000 | Gautheron | .................. G01M 11/3172 356/73.1 |
| 7,630,641 | B1 | * | 12/2009 | Uhlhorn | ............... H04B 10/071 398/28 |

(Continued)

FOREIGN PATENT DOCUMENTS

DE    19641441 A1    4/1998

OTHER PUBLICATIONS

Extended European Search Report, European Application No. 16194825. 2, dated Mar. 30, 2017, 5 pages.

(Continued)

*Primary Examiner* — Tarifur R Chowdhury
*Assistant Examiner* — Omar H Nixon

(57) ABSTRACT

An optical time domain reflectometer for determining properties of an optical transmission fiber, the optical time domain reflectometer comprising an electro-absorption modulator comprising a waveguide and two electrodes, wherein the waveguide is arranged between the electrodes, a light source configured for emitting sampling light into the waveguide, wherein the waveguide is connected or to be connected between the fiber and the light source, and a control unit for controlling the operation of the light source and a modulation voltage between the electrodes. The electro-absorption modulator is capable of assuming an absorption state, wherein the electro-absorption modulator is further configured for receiving reflected light pulses resulting from the reflection of the pulses of sampling light in the fiber, wherein the absorption of reflected light pulses in the electro-absorption modulator results in the creation of a photocurrent between the electrodes.

15 Claims, 3 Drawing Sheets

(56) References Cited

U.S. PATENT DOCUMENTS

| | | | | |
|---|---|---|---|---|
| 9,128,309 | B1* | 9/2015 | Robertson | G02F 1/035 |
| 9,838,135 | B1* | 12/2017 | Xu | H04B 10/503 |
| 2006/0120659 | A1* | 6/2006 | Yee | G02B 6/12004 |
| | | | | 385/14 |
| 2009/0169148 | A1* | 7/2009 | Doerr | G02F 1/2257 |
| | | | | 385/3 |
| 2010/0299489 | A1* | 11/2010 | Balachandriah | G06F 11/3442 |
| | | | | 711/162 |
| 2015/0171958 | A1* | 6/2015 | Webb | H04B 10/071 |
| | | | | 398/37 |
| 2017/0310390 | A1* | 10/2017 | Shiner | H04B 10/0775 |

OTHER PUBLICATIONS

Welstand, R.B. et al., "Dual-Function Electroabsorption Waveguide Modulator/Detector for Optoelectronic Transceiver Applications," IEEE Photonics Technology Letters, vol. 8 (11): 1540-1542 (1996).

\* cited by examiner

OTDR USING AN ELECTRO-ABSORPTION MODULATOR FOR BOTH PULSE FORMING AND PULSE DETECTION

PRIORITY INFORMATION

This application claims priority to and the benefit of European Patent Application No. 16194825.2, filed in the European Patent Office on Oct. 20, 2016, the entire contents of which are incorporated herein by reference.

FIELD OF THE INVENTION

The present invention is in the field of fiber-optic communication. In particular, the present invention relates to an optical time domain reflectometer (OTDR) for determining properties of an optical transmission fiber and to a corresponding method of determining properties of an optical transmission fiber using an OTDR.

BACKGROUND OF THE INVENTION

OTDRs are used in the field of fiber-optic communication to gain insight into the main optical parameters of an optical transmission fiber, like information regarding fiber attenuation, and to detect impairments or irregularities, like deteriorated connectors or fiber breakages. An OTDR typically comprises a light-emitting device and a light detecting device. The light-emitting device sends a light pulse into the fiber, which is then partly reflected back by the fiber itself and/or by an irregularity in the fiber. The reflected light pulse is then received by the detecting device and subsequently analysed so as to extract characterising information about the optical transmission fiber. For example, assuming knowledge of the speed of light in the fiber, a measure of the time elapsed between the emission of a light pulse by the light-emitting device and the detection of the reflected light pulse at the light detecting device can be straightforwardly converted into information about the distance between the OTDR and the corresponding reflection point.

There are two types of reflection phenomena relevant to OTDRs. On the one hand, no optical transmission fiber provides perfect absorption-free transmission. Reflection and absorption by impurities inside the fiber cause the light to be redirected in different directions creating both signal attenuation and backscattering, known as Rayleigh backscattering. Rayleigh backscattering can be used to calculate the level of attenuation in the fiber as a function of fiber distance. Since fiber attenuation typically presents an exponential behaviour, it is usually expressed in dB/km.

On the other hand, when a light pulse travelling in the fiber hits an abrupt medium transition, like for example a connector, a mechanical splice or a fiber breakage, the consequent abrupt change in the index of refraction causes a large amount of light to be reflected back. This phenomenon is known as Fresnel reflection and can be thousands of times more significant than Rayleigh backscattering. In terms of OTDR, Fresnel reflection phenomena leave a characteristic trace in the form of a peak signal, corresponding to an abrupt increment in the amount of reflected light.

As commonly known in the art, when a high amount of light is reflected back and received at the detector, the detector is temporarily blinded or saturated. Subsequent reflection events may only be detected once the detector is fully operative again. This effectively takes some time and the period of time during which the detector cannot detect reflection events translates into a spatial range of the fiber in which a reflection point would not be seen by the OTDR. This spatial range is known as the dead zone. Having the shortest-possible dead zone is a highly relevant issue in the field of fiber-optic communication.

For example, when testing in the premises of dense optical networks, dead zones which are not short enough might lead to various junction points or connectors being missed and not identified by the technicians, which makes it harder to locate potential problems. Further, the accuracy when determining the position of a fiber breakage is crucial for the feasibility of the reparation works, since many optical transmission fibers are installed underground or undersea. Manufacturers hence usually struggle to provide OTDRs able to operate with very short pulses so as to provide for shorter dead zones.

Power modulated laser diodes are commonly used as light-emitting devices in OTDRs. In order to provide for short light pulses, a laser diode has to be periodically switched on and off at a high rate. A side effect of this is that the carrier density in the active region of a laser diode undergoes instability periods after turning on and off, and this leads to temporally varying frequency of the emitted light, i.e., to a chirp in the laser output. Such chirp can have substantial effects when the light pulses are transmitted through a long optical fiber. Essentially, this is because the chromatic dispersion of the fiber induces a frequency-dependent time delay, and this in conjunction with chirp leads to signal degradation, which may for example result in a degree of accuracy of an OTDR decreasing with fiber distance between the OTDR and an irregularity to be detected.

A possibility to circumvent this problem relies on the use of extra equipment such as optical intensity modulators. The laser can then operate continuously while the intensity of the light pulses sent into the fiber is controlled by the modulator. However this solution involves additional production costs and more complicated designs due to the additional pieces of equipment required and the corresponding connections.

Further, the light pulses generated by the light-emitting device must be separated from the reflected light pulses to be detected by the light detecting device, so that the measurements of the light detecting device are not disturbed by the light emitted by the light detecting device. For this purpose, the light pulses generated by the light-emitting device, which are to be coupled into the fiber, are typically spatially separated from those to be detected at the light detecting device, which enter the OTDR coming from the fiber, by means of an optical circulator, an isolator, or a directional coupler. However, these are usually notably expensive pieces of equipment, which further suffer from a loss of intensity in signals transmitted through them, which may result in poor accuracy of the OTDR. A typical directional coupler induces a round-trip loss of around 6 dB. In the case of a regular isolator, the round-trip loss may be of about 2 dB at the expense of a more costly solution.

In view of the above, there is room for technical improvements in the determination of the position of irregularities in an optical transmission fiber using an OTDR regarding the complexity and costs of the required components as well as the reduction of chirp.

SUMMARY OF THE INVENTION

The problem underlying the invention is to provide an OTDR and a method for determining the position of an irregularity in an optical transmission fiber. This problem is solved by an OTDR according to claim 1 and a method according to claim 9. Herein, an irregularity is understood to have a broad meaning and covers any kind of abrupt medium change resulting in an abrupt modification of the index of refraction of the optical transmission fiber due to, for instance, a breakage, a defect, connections between different types of fibers, an interruption or any other kind of irregularity. Preferred embodiments of the invention are described in the dependent claims.

The invention relates to an OTDR for determining properties of an optical transmission fiber, the OTDR comprising an electro-absorption modulator, a light source, and a control unit. The electro-absorption modulator comprises a waveguide and two electrodes, wherein the waveguide is arranged between the electrodes. The light source is configured for emitting sampling light into the waveguide, wherein the waveguide is connected or to be connected between the fiber and the light source. The light source may comprise a laser diode or any other kind of suitable light source. The control unit is configured for controlling the operation of the light source and a modulation voltage between the electrodes of the electro-absorption modulator.

An electro-absorption modulator is a semiconductor device the optical absorption of which changes according to the Franz-Keldysh effect when an electrical field is applied the electrodes. In the absence of an electric field, a photon with an energy lying below the bandgap of the semiconductor cannot excite an electron from the valence band to the conduction band and hence cannot be absorbed. However, when an electric field is applied between the electrodes of the electro-absorption modulator, the potential energy between the valence band and a conduction band is reduced, i.e. the bandgap decreases. This makes the quantum probability that a photon crossing the semiconductor can excite an electron from the valence band to the conduction band increase. Hence the effective bandgap decreases with an increasing electrical field, that is to say, the optical absorption in the electro-absorption modulator increases with increasing electric field.

In the OTDR of the invention, depending on the value of the modulation voltage, the electro-absorption modulator is capable of assuming an absorption state and a transmission state. In the absorption state, the modulation voltage assumes a value from a first range of values, in which at least a predominant part of sampling light emitted into the waveguide is absorbed. When in the absorption state, the electro-absorption modulator absorbs most or all of the sampling light emitted into the waveguide by the light source which is hence not transmitted into the fiber. In the transmission state, the modulation voltage assumes a value from a second range of values, in which the degree of absorption is smaller than in the absorption state.

When in the transmission state, less light is absorbed in the electro-absorption modulator than in the absorption state. Hence part of the sampling light emitted into the waveguide by the light source, at least more than when the electro-absorption modulator is in the absorption state, is transmitted to the fiber. In particular, the first and second range of values may be such that in the absorption state. The attenuation of the sampling light coupled into the waveguide of the electro-absorption modulator differs by the attenuation in the transmission state by at least 10 dB, preferably at least 13 dB and most preferably by at least 20 dB. A typical attenuation in the transmission state could be in a range of 8 to 15 dB, and the attenuation in the absorption state is correspondingly higher.

The control unit is configured for controlling the generation of sampling light pulses by switching the modulation voltage from said first range of values to said second range of values while the light source is on, keeping said modulation voltage within said second range of values for a first time interval, and switching the modulation voltage back to the first range of values. Thereby, the amount of sampling light emitted into the waveguide by the light source will increase considerably during said first time interval giving rise to a light pulse being sent into the fiber. The control unit is further configured for switching off the light source after switching the modulation voltage back to the first range of values. From then on, no sampling light is emitted into the waveguide by the light source, which means that any light entering the electro-absorption modulator is reflected light coming from the fiber. In some embodiments, the control unit is configured for switching off the light source already prior to switching the modulation voltage back to said first range of values. In this case the end of the light pulse would be controlled via the light source rather than the electro-absorption modulator. This embodiment, however, does make use of the detection functionality of the electro-absorption modulator to be described next. Namely, the electro-absorption modulator is further configured for receiving reflected light pulses resulting from the reflection of sampling light pulses in the fiber, wherein the absorption of reflected light pulses in the electro-absorption modulator results in the creation of a photocurrent between the electrodes.

It is therefore seen that both the functionalities of a light-emitting device and a light detection device, which are commonly provided by separate devices in the prior art, are combined in the electro-absorption modulator in the OTDR of the invention. This reduces the number of electro-optical devices needed to carry out the functionalities of an OTDR, which results in a more reliable and easier to manufacture setup when compared to existing models.

The double functionality of the electro-absorption modulator allows avoiding the use of extra pieces of equipment and connectors (splices) to separate the sampling light from the reflected light, like circulators, isolators or couplers. This further increases the simplicity of the setup and reduces the manufacturing and operating costs of an OTDR. Further, since no intermediate devices are needed for light separation, the corresponding intensity losses can be eliminated, which contributes to a better accuracy and a longer detection range of an OTDR for a given light source.

In addition, compared to conventional OTDRs based on direct modulation of laser light, the OTDR of the invention provides a much broader band width range, where frequencies of up to the GHz domain may in some embodiments be achieved, while the problems related to chirp can be significantly reduced. Consequently, the short light pulses provided by the OTDR of the invention are less subject to chromatic dispersion in the optical fiber than is the case in prior art OTDRs. Accordingly, an OTDR with an improved accuracy is provided.

In a preferred embodiment of the invention, the OTDR further comprises a processing unit configured for detecting the photocurrent between the electrodes, and for determining a time delay between a pulse of sampling light being sent into the fiber and a photocurrent being created in the electro-absorption modulator by a corresponding reflected light pulse. As far as the light source is off when a pulse of reflected light coming from the fiber reaches the electro-absorption modulator, any photons in the waveguide correspond to reflected light. Due to the reduced effective bandgap of the electro-absorption modulator, electrons from the valence band will be excited to the conduction band, thereby creating a photocurrent between the electrodes that is detected by the processing unit. Consequently, the position of an irregularity in the optical transmission fiber can be determined.

According to a preferred embodiment of the invention, the processing unit is further configured for analyzing an amplitude and/or a duration of the photocurrent created in the electro-absorption modulator by a reflected light pulse. The analysis of such properties of the photocurrent allows determining information about the irregularity at which the reflection of the sampling light has taken place. For example, information about the reflectance of an irregularity obtained from the analysis of an amplitude of a reflected light pulse may reveal whether the reflection has taken place at a connector or some other piece of equipment or at a fiber breakage.

In a preferred embodiment of the invention, the first time interval is between 0.1 µs and 100 µs, preferably between 0.5 µs and 10 µs. Such first time interval, during which the electro-absorption modulator temporarily is in the transmission state, determines the duration of the light pulses sent into the fiber, when the light source is switched off prior to switching the modulator voltage back to said first range of values. In particular the first time interval may be optimized for a particular application, such that a desired resolution of the OTDR measurement and/or a desired reach of detection can be achieved.

In a preferred embodiment of the invention, the first range of values is between 1 V and 5 V, preferably between 2 V and 3 V.

According to a preferred embodiment of the invention, the second range of values is between −0.5 V and 0.5 V, preferably between −0.2 V and 0.2 V.

In a preferred embodiment of the invention, the control unit is configured for switching off the light source an offset time after switching the modulation voltage back to the first range of values, wherein the offset time preferably is between 10 ns and 100 ns. Said offset time corresponds to the time during which sampling light continues to be emitted into the waveguide of the electro-absorption modulator and hence during which a photocurrent due to sampling light is generated between the electrodes thereof. Thus, the duration of said offset time determines the time during which a photocurrent due to a reflected light pulse could not be detected in the electro-absorption modulator and hence effectively determines the length of the dead zone. In particular the offset time may be chosen such that, for a particular application, the resulting dead zone does not exceed a predefined value.

According to a preferred embodiment of the invention, the light source and the electro-absorption modulator are comprised in an integrated device, which may for example be a photonic integrated circuit. This makes the setup of the OTDR of the invention very reliable and easy to manufacture, and contributes to a reduction of maintenance and logistics costs for operators.

The invention further relates to a method of determining properties of an optical transmission fiber with an optical time domain reflectometer, said optical time domain reflectometer comprising an electro-absorption modulator, and a light source. The electro-absorption modulator comprises a waveguide and two electrodes, wherein the waveguide is arranged between the electrodes. The light source is configured for emitting sampling light into the waveguide and the waveguide is connected between the fiber and the light source. A modulation voltage between the electrodes determines the absorptivity of the electro-absorption modulator. The electro-absorption modulator is capable of assuming an absorption state and a transmission state as elucidated above. The method comprises generating sampling light pulses by:

switching the modulation voltage from said first range of values to said second range of values while the light source is on, keeping said modulation voltage within said second range of values for a first time interval, switching the modulation voltage back to the first range of values, and switching off the light source prior to or after switching the modulation voltage back to the first range of values.

According to a preferred embodiment of the invention, the electro-absorption modulator is further configured for receiving reflected light pulses resulting from the reflection of the pulses of sampling light in the fiber, wherein the absorption of reflected light in the electro-absorption modulator results in the creation of a photocurrent between the electrodes, and the method further comprises detecting the photocurrent between the electrodes, and determining a time delay between a pulse of sampling light being sent into the fiber and a photocurrent being created in the electro-absorption modulator by a corresponding reflected light pulse.

In a preferred embodiment of the invention, the method further comprises analyzing an amplitude and/or a duration of the photocurrent created in the electro-absorption modulator by a reflected light pulse.

According to a preferred embodiment of the invention, the method further comprises processing a photocurrent created in the electro-absorption modulator by a reflected light pulse so as to obtain information about the fiber.

In a preferred embodiment of the invention, the method further comprises a step of switching off the light source prior to or after switching the modulation voltage back to the first range of values comprises switching off the light source an offset time after switching the modulation voltage back to the first range of values, wherein the offset time preferably is between 10 ns and 100 ns.

DESCRIPTION OF THE PREFERRED EMBODIMENTS

Figure 1:
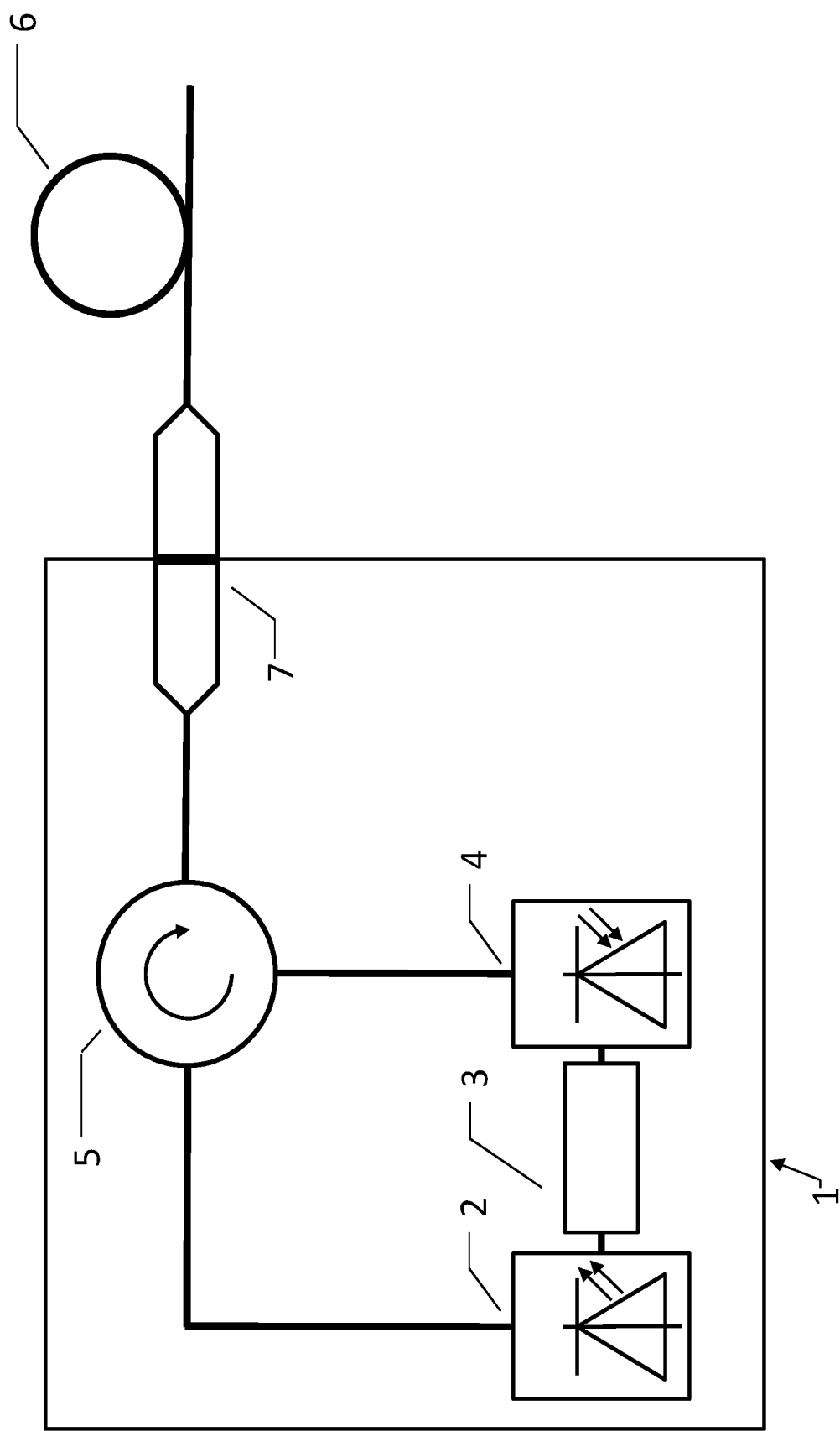
FIG. 1 shows a schematic representation of a conventional OTDR.

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

FIG. 1 shows a schematic representation of a conventional OTDR 1 comprising a light-emitting device 2 and a light detection device 4. The light-emitting device 2 is configured for emitting sampling light pulses into the optical transmission fiber 6 via a connector 7. The sampling light pulses pass through the circulator 5 and are reflected at an irregularity in the optical transmission fiber 6, resulting in reflected light pulses. The reflected light pulses circulate back to the circulator 5 and are directed to the light detection device 4. A control module 3 is functionally connected to the light-emitting device 2 and the light detection device 4 and is configured for controlling the operation of the light-emitting device 2 and for analysing the reflected light pulses detected at the light detection device 4. Were it not for the circulator 5, sampling light stemming from the light-emitting device 2 could incidentally deviate to the light detection device 4 on the way towards the fiber 6, thereby causing the detection of light not corresponding to reflected light pulses and leading to erroneous detection or characterisation of an irregularity. Further, the circulator 5 guarantees that reflected light coming from the fiber 6 is directed towards the light detection device 4, for otherwise such reflected light could partially deviate towards the light-emitting device 2, which would affect the measurement at the light detection device 4.

The circulator 5 plays a crucial role for the proper functioning of the OTDR 1, because it allows spatially separating the sampling light from the reflected light. However this conventional setup has the disadvantage that the control module 3 must be independently connected to the light-emitting device 2 and to the light detection device 4. Further, the circulator 5 is an expensive optical component that causes an intensity loss in the reflected light arriving at the light detection device 4. These drawbacks are circumvented by the OTDR of the invention.

Figure 2:
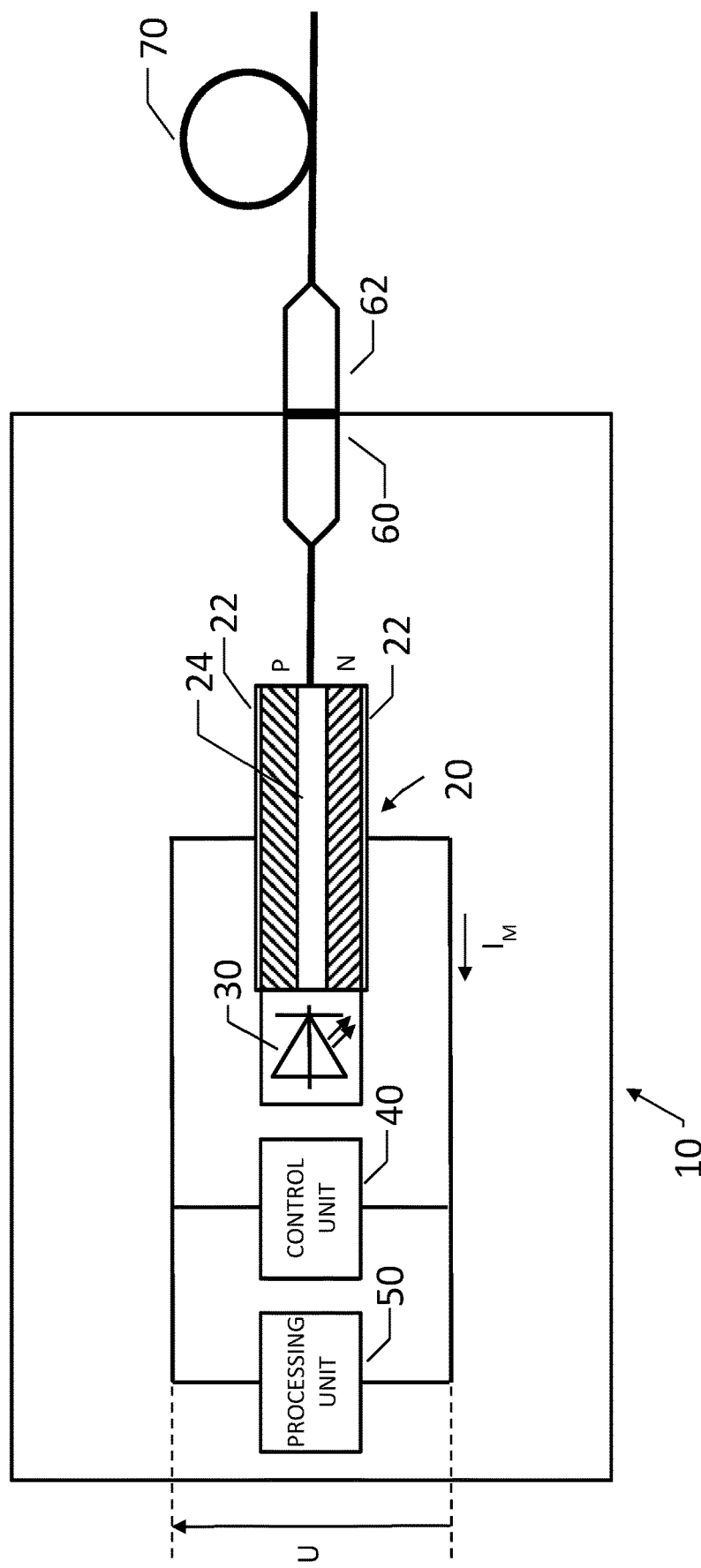
FIG. 2 shows a schematic representation of an OTDR according to an embodiment of the invention

FIG. 2 shows a schematic representation of an OTDR 10 according to an embodiment of the invention. The OTDR 10 comprises an electro-absorption modulator 20, a light source 30, a control unit 40, and a processing unit 50. The electro-absorption modulator 20 comprises a waveguide 24 and two electrodes 22, wherein the waveguide 24 is arranged between the electrodes 22. The waveguide 24 displays a semiconductor PIN structure. The light source 30 is configured for emitting sampling light into the waveguide 24 of the electro-absorption modulator 20, wherein the waveguide 24 is connected between the light source 30 and the optical transmission fiber 70 to which the OTDR 10 is connected through the connection ports 60 and 62.

The control unit 40 is operationally connected to the electro-absorption modulator 20 and to the light source 30, and is configured for adjusting a modulation voltage $U_M$ between the electrodes 22 and for controlling the operation of the light source 30. Depending on the value of the modulation voltage $U_M$, the electro-absorption modulator 20 is capable of assuming an absorption state and a transmission state as elucidated above. In the embodiment shown, the first and second range of values are chosen such that when the electro-absorption modulator 20 is in the absorption state, the sampling light emitted into the waveguide 24 by the light source 30 experiences an absorption of 30 dB in the electro-absorption modulator 20, such that no or almost no sampling light is transmitted to the fiber 70. Instead, when the electro-absorption modulator 20 is in the transmission state, the sampling light emitted into the waveguide 24 by the light source 30 experiences an absorption of around 10 dB in the electro-absorption modulator 20, such that a significant part of the sampling light emitted into the waveguide 24 by the light source 30 is transmitted to the fiber 70.

The control unit 40 is configured for switching the modulation voltage $U_M$ from a value $U_1$ corresponding to said first range of values to a second value $U_2$ corresponding to said second range of values when the light source 30 is on. For a short period of time t, the modulation voltage is kept at said second value $U_2$. During this time, the absorptivity of the electro-absorption modulator 20 is reduced to a minimum, such that a pulse of sampling light is transmitted to the fiber 70. After the time t, the control unit 40 switches the modulation voltage $U_M$ back to the first value $U_1$, such that sampling light is no longer transmitted to the fiber 70. An offset time T later, the control unit 40 switches off the light source 30 so that sampling light stops being emitted into the waveguide 24. From this moment on any light detected in the electro-absorption modulator 20 in the form of a photocurrent must be reflected light coming from the fiber 70. Advantageously, since the light source 30 is already on when the control unit 40 switches the value of the modulation voltage $U_M$ so as to switch the electro-absorption modulator 20 from absorption state to transmission state, no chirp is caused in this process.

The electro-absorption modulator 20 is configured for receiving reflected light pulses resulting from the reflection of the pulses of sampling light in the fiber 70, wherein the absorption of reflected light in the waveguide 24 of the electro-absorption modulator 20 results in the creation of a photocurrent $I_M$ between the electrodes 22. The processing unit 50 is functionally connected to the electro-absorption modulator 20 and configured for detecting the photocurrent $I_M$ between the electrodes 22. The processing unit 50 is further configured for analysing a time delay between a pulse of sampling light being sent into the fiber 70 by switching the modulation voltage $U_M$ between the first value $U_1$ and the second value $U_2$ and a photocurrent being created in the electro-absorption modulator 20 by a corresponding reflected light pulse. This procedure is illustrated in FIG. 3.

Figure 3:
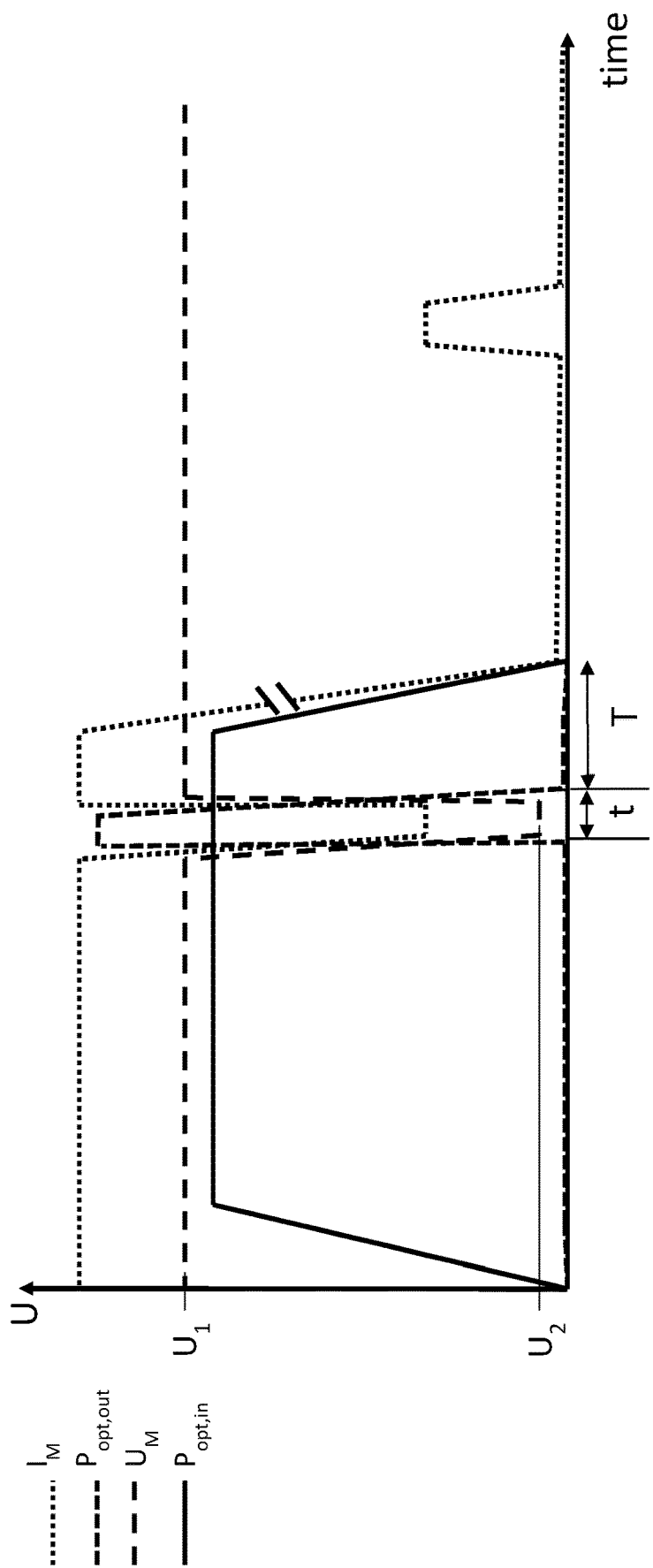
FIG. 3 shows a schematic plot of the time evolution of sampling light power, modulation voltage, photocurrent, and transmitted light power.

FIG. 3 shows a schematic plot of the time evolution of the light source power $P_{opt,in}$, the modulation voltage $U_M$, the photocurrent $I_M$ measured between the electrodes 22 by the processing unit 50 and the light power of the transmitted sampling light $P_{opt,out}$, which is transmitted through the electro-absorption modulator 20 to the fiber 70.

The electro-absorption modulator 20 starts in its absorption state, in which the modulation voltage is kept at the first value $U_1$. A given equilibration time after the light source 30 has been turned on, it reaches its stable emitting state and starts producing sampling light at a constant power $P_{opt,in}$. Since the electro-absorption modulator 20 absorbs almost all of the sampling light emitted into the waveguide 24 by the light source 30, substantially no sampling light reaches the fiber 70 and the power of the transmitted light $P_{opt,out}$ remains at base level. Meanwhile, the processing unit 50 measures a constant photocurrent $I_M$ produced in the electro-absorption modulator 20 by the sampling light absorbed therein.

At a given time, the control unit 40 switches the modulation voltage $U_M$ from the first value $U_1$ to the second value $U_2$, thereby switching the electro-absorption modulator 20 to the transmission state. When this happens, the absorptivity of the electro-absorption modulator 20 suddenly decreases. Therefore, the electro-absorption modulator 20 no longer absorbs most of the sampling light sent into the waveguide 24 by the light source 30. This allows a substantial part of said sampling light to be transmitted through the electro-absorption modulator 20 to the fiber 70, as indicated by the sudden increase in the transmitted light power $P_{opt,out}$.

The electro-absorption modulator 20 is kept in the transmission state by keeping the modulation voltage $U_M$ at the second value $U_2$ for a first time interval t. During this time, photons of sampling light traversing the electro-absorption modulator 20 do not scatter or excite any charge carriers in the waveguide 24 to any significant degree. For this reason, the photocurrent $I_M$ measured by the processing unit 50 decreases during the first time interval t.

After the first time interval t has lapsed, the control unit 40 switches the modulation voltage $U_M$ back to the first value $U_1$ and the electro-absorption modulator 20 returns to the absorption state. Therefore, the power of the sampling light transmitted to the fiber 70 drops back to base level. Since sampling light continues being emitted by the light source 30 into the waveguide 24 of the electro-absorption modulator 20, a photocurrent $I_M$ is again measured by the processing unit 50.

After an offset time T, the control unit 40 switches of the light source 30. Hence the power $P_{opt,in}$ of the sampling light emitted into the waveguide 24 drops to base level and so does the photocurrent measured by the processing unit 50. This allows the processing unit 50 to detect the reflected light pulse that reaches the electro-absorption modulator 20 later on, as shown in FIG. 3. At this stage, since the light source 30 is off, no sampling light is being emitted into the waveguide 24. Thus, the detected photocurrent can only be due to a reflected light pulse coming from the fiber 70.

The processing unit 50 can extract details about the irregularity from which the reflected light pulse stems. For example, by analysing a time delay between switching the electro-absorption modulator 20 from the absorption state to the transmission state and the detection of the reflected light pulse, the processing unit 50 can infer the distance between the OTDR and the irregularity, which equals that time delay times the speed of light in the fiber 70, divided by 2. Other properties of the photocurrent $I_M$ due to the reflected light pulse, like its amplitude or its duration, can also be analysed by the processing unit 50 to characterise the irregularity at which the reflected light pulse has been reflected back to the OTDR.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the claims.

The invention claimed is:

1. An optical time domain reflectometer for determining properties of an optical transmission fiber, the optical time domain reflectometer comprising:
   an electro-absorption modulator comprising a waveguide and two electrodes, wherein the waveguide is arranged between the electrodes;
   a light source configured for emitting sampling light into the waveguide, wherein the waveguide is adapted to communicatively connect between the fiber and the light source; and
   wherein the electro-absorption modulator is capable of assuming:
      an absorption state, when the modulation voltage assumes a value from a first range of values, in which at least a predominant part of sampling light emitted into the waveguide is absorbed; and
      a transmission state, when the modulation voltage assumes a value from a second range of values, in which the degree of absorption is smaller than in said absorption state;

wherein the optical time domain reflectometer is adapted to control the light source and a modulation voltage between the electrodes according to the steps of:
      switching the modulation voltage from said first range of values to said second range of values while the light source is on,
      keeping said modulation voltage within said second range of values for a first time interval,
      switching the modulation voltage back to the first range of values, and
      switching off the light source prior to or after switching the modulation voltage back to the first range of values;
   wherein the electro-absorption modulator is adapted to enable, in at least one state of the electro-absorption modulator, communication of sampling light into the fiber, and wherein the electro-absorption modulator is adapted to receive, in at least one state of the electro-absorption modulator, reflected light resulting from reflection of sampling light in the fiber, wherein absorption of the reflected light in the electro-absorption modulator results in creation of a photocurrent between the electrodes that the optical time domain reflectometer is adapted to detect.

2. The optical time domain reflectometer of claim 1, wherein the optical time domain reflectometer is adapted to determine a time delay between a pulse of sampling light sent into the fiber and a photocurrent created in the electro-absorption modulator by a corresponding reflected light pulse.

3. The optical time domain reflectometer of claim 1, wherein the optical time domain reflectometer is adapted to analyze an amplitude and/or a duration of the photocurrent created in the electro-absorption modulator by a reflected light pulse.

4. The optical time domain reflectometer of claim 1, wherein the first time interval is between 0.1 µs and 100 µs.

5. The optical time domain reflectometer of claim 1, wherein the first range of values is between 1 V and 5 V.

6. The optical time domain reflectometer of claim 1, wherein the second range of values is between −0.5 V and 0.5 V.

7. The optical time domain reflectometer of claim 1, wherein control further comprises switching off the light source an offset time after switching the modulation voltage back to the first range of values.

8. The optical time domain reflectometer of claim 1, wherein the light source and the electro-absorption modulator are comprised in an integrated device.

9. A method of determining properties of an optical transmission fiber with an optical time domain reflectometer, said optical time domain reflectometer comprising
   an electro-absorption modulator comprising a waveguide and two electrodes, wherein the waveguide is arranged between the electrodes; and
   a light source configured for emitting sampling light into the waveguide, wherein the waveguide is adapted to communicatively connect between the fiber and the light source;
   wherein the electro-absorption modulator is adapted to enable, in at least one state of the electro-absorption modulator, communication of sampling light into the fiber, and wherein the electro-absorption modulator is adapted to receive, in at least one state of the electro-absorption modulator, at least one reflection of sampling light in the fiber, wherein an absorption in the electro-absorption modulator of the at least one reflection of sampling light in the fiber results in creation of a photocurrent between the electrodes, and wherein a modulation voltage between the electrodes determines the absorptivity of the electro-absorption modulator, wherein the electro-absorption modulator is capable of assuming
- an absorption state, when the modulation voltage assumes a value from a first range of values, in which at least a predominant part of sampling light emitted into the waveguide is absorbed; and
- a transmission state, when the modulation voltage assumes a value from a second range of values, in which the degree of absorption is smaller than in said absorption state;

the method comprising generating sampling light, using the optical time domain reflectometer to control the light source and the modulation voltage between the electrodes, by:
- switching the modulation voltage from said first range of values to said second range of values while the light source is on,
- keeping said modulation voltage within said second range of values for a first time interval,
- switching the modulation voltage back to the first range of values, and
- switching off the light source prior to or after switching the modulation voltage back to the first range of values; and the method further comprising detecting the photocurrent between the electrodes.

10. The method of claim 9, the method further comprising determining a time delay between a pulse of sampling light sent into the fiber and a photocurrent created in the electro-absorption modulator by a corresponding reflected light pulse.

11. The method of claim 10, further comprising analyzing an amplitude and/or a duration of photocurrent created in the electro-absorption modulator by a reflected light pulse.

12. The method of claim 10, further comprising processing a photocurrent created in the electro-absorption modulator by a reflected light pulse so as to obtain information about the fiber.

13. The method of claim 9, wherein the first time interval is between 0.1 µs and 100 µs.

14. The method of claim 9, wherein the first range of values is between 1 V and 5 V; and/or wherein the second range of values is between −0.5 V and 0.5 V.

15. The method of claim 9, wherein the step of switching off the light source prior to or after switching the modulation voltage back to the first range of values comprises switching off the light source an offset time after switching the modulation voltage back to the first range of values.

* * * * *